No. 892,552. PATENTED JULY 7, 1908.
F. REXER.
CAKE CUTTING GUIDE AND GAGE.
APPLICATION FILED JAN. 10, 1908.
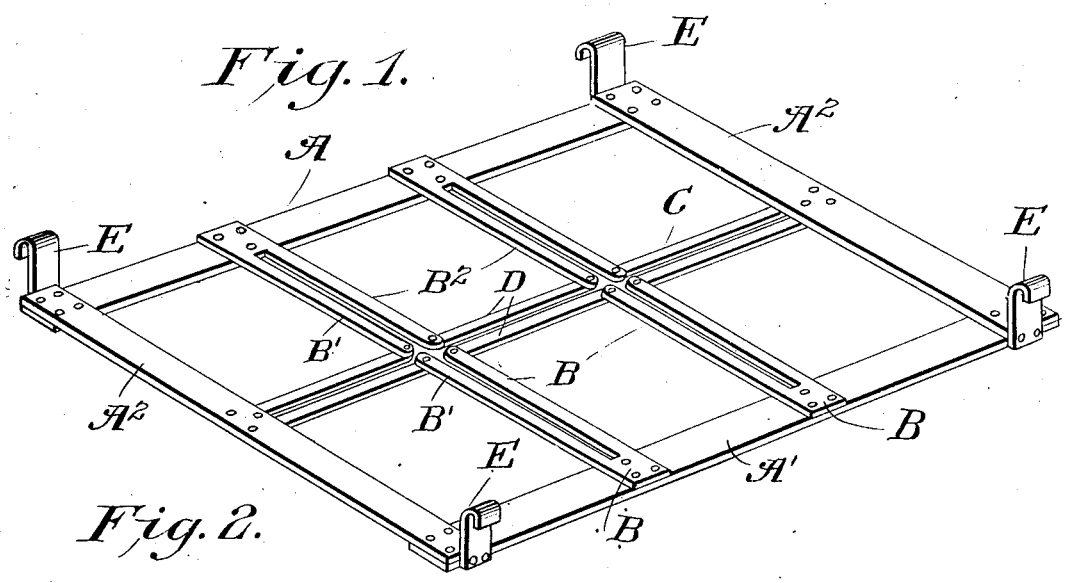
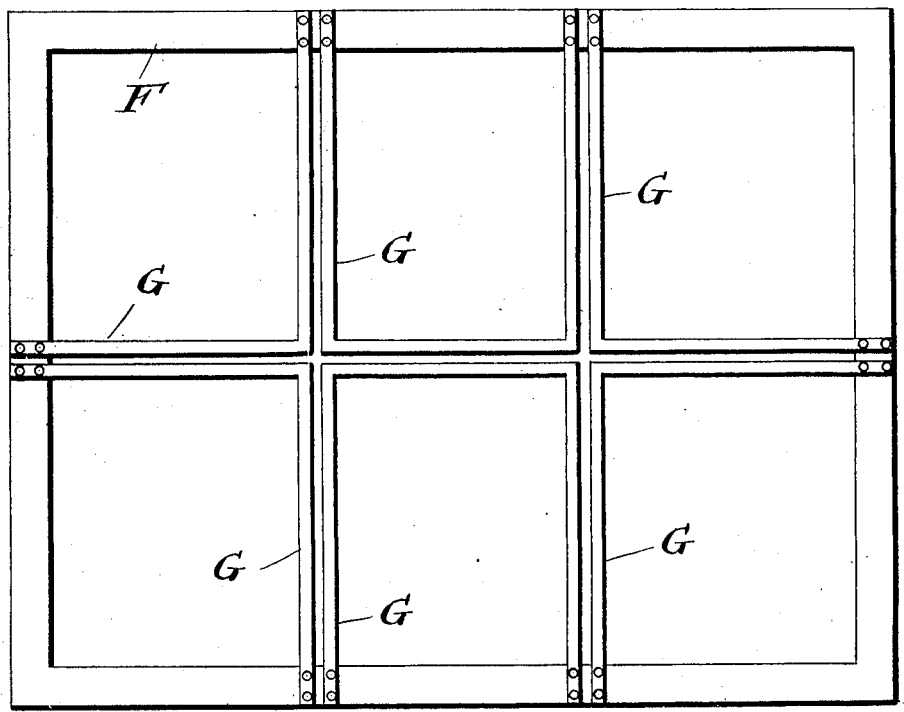
Inventor
Frederick Rexer
Witnesses

UNITED STATES PATENT OFFICE.

FREDRICK REXER, OF PHILADELPHIA, PENNSYLVANIA.

CAKE-CUTTING GUIDE AND GAGE.

No. 892,552.   Specification of Letters Patent.   Patented July 7, 1908.

Application filed January 10, 1908. Serial No. 410,135.

*To all whom it may concern:*

Be it known that I, FREDRICK REXER, a citizen of the United States, residing at Philadelphia, in the county of Philadelphia and State of Pennsylvania, have invented certain new and useful Improvements in Cake-Cutting Guides and Gages, of which the following is a specification.

This invention relates to a guide and gage for cutting cakes and pies of all kinds, the object being to provide a frame, having transverse and longitudinal slots, adapted to be supported by the pan containing the cake or pie to be cut, so that the knife placed in the slot will be guided as drawn through the pie or cake, whereby it will be equally divided, the cake being cut evenly as to form a very neat appearance.

Another object of my invention is, to provide means for supporting the frame above the pie or cake to be cut, so that it will not disfigure the same when being used on iced cakes.

Another object of my invention is, to provide a frame which is exceedingly simple and cheap in construction, and one which is very effective in use.

These objects are obtained by the novel arrangement and construction of parts hereinafter fully described and shown in the accompanying drawings in which:

Figure 1, is a perspective view of my improved device, and, Fig. 2, is a plan view of a modified form.

In the drawings A, indicates a rectangular frame formed of side bars A', connected together at their ends by cross bars A², which are riveted on the top of the side bars, so as to form a rigid rectangular frame. Extending inwardly from the side bars are spaced bifurcated bars B, composed of members B' and B². The outer ends of the members B', are connected to the respective ends of the bifurcated bars C, by rivets, which extend inwardly from the cross bars of the frame, and the members B², of the bifurcated bars are connected together by strips D, forming a plurality of angle frames, spaced apart so as to form guide slots through which the knife for cutting the cake or pie is adapted to be inserted and guided. The bars B, being secured on the top of the side bars by rivets, and the bars C, being secured to the underside of the cross bars by rivets, whereby the overlapping ends can be secured together without throwing the bars out of the perfectly horizontal position.

Secured to the corners of the frame are hooked members E, adapted to fit over the edge of the pan containing the cake or pie, and support the frame within the same, it of course being understood, that these frames are formed of different sizes, so as to fit different size pans, and in bakeries where this device is especially adapted to be used, a plurality of pans are used of different sizes to fit different size ovens, and it will be seen that it will be only necessary to have a frame to fit each size pan.

In the modification shown in Fig. 2, I provide a rectangular frame F, which has extending inwardly from its side members angle frames G, which are spaced apart, so as to form longitudinal and transverse guide slots. It will also be seen that the device can be formed of a sheet of metal, provided with longitudinal and transverse guide slots.

Having thus described my invention what I claim as new and desire to secure by Letters Patent is:

1. A device of the kind described, comprising a rectangular frame, having a plurality of angle frames extending inwardly from its sides, spaced apart to form longitudinal and transverse guide slots, and supporting members carried by said frame.

2. A cake cutting guide and gage, comprising a rectangular frame, having a plurality of inwardly projecting bifurcated bars, extending inwardly from its sides, the overlapping ends of said bifurcated bars being connected together, bars for connecting the central bifurcated bars together, whereby transverse and longitudinal guide slots will be formed, and hooks secured to the corners of the frame for supporting said frame within a pan.

In testimony whereof I have signed my name to this specification in the presence of two subscribing witnesses.

FREDRICK REXER.

Witnesses:
R. H. KRENKEL,
REA P. WRIGHT.